May 21, 1963 E. C. FLOYD 3,090,832

NOISE CANCELLATION CIRCUIT

Filed Jan. 30, 1961 2 Sheets-Sheet 1

INVENTOR.
Earl C. Floyd
BY James T. Barr
ATTY.

NOISE CANCELLATION CIRCUIT

Filed Jan. 30, 1961 2 Sheets-Sheet 2

INVENTOR.
Earl C. Floyd
BY James T. Barr
ATTY.

3,090,832

NOISE CANCELLATION CIRCUIT

Earl C. Floyd, Westchester, Ill., assignor to Admiral Corporation, Chicago, Ill., a corporation of Delaware Filed Jan. 30, 1961, Ser. No. 85,614
3 Claims. (Cl. 178—7.3)

Figure 1:
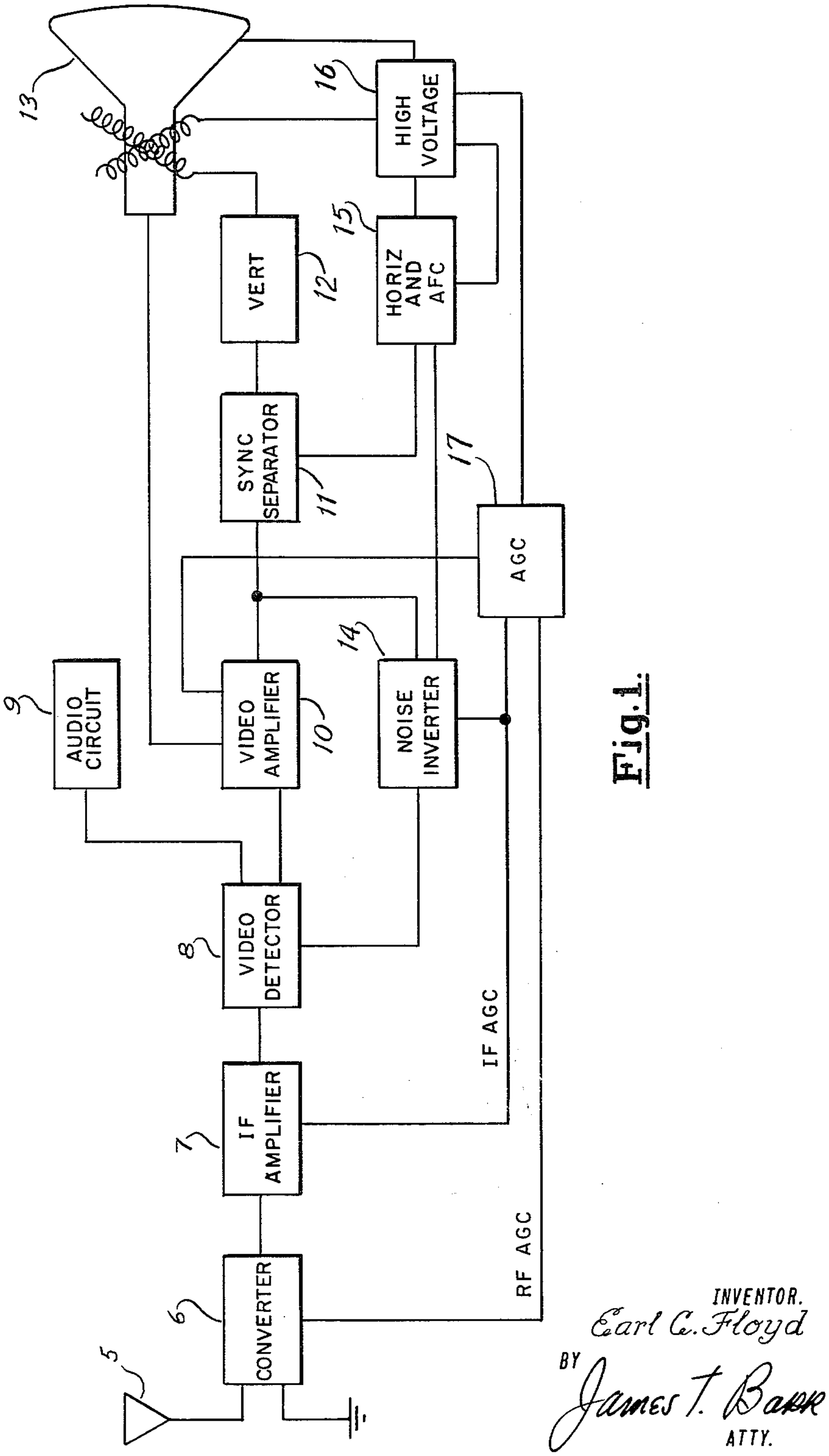

This invention relates in general to television receivers and in particular to circuitry therein for improving the visual display presented on the screen of a television receiver under adverse signal conditions.

A conventional television signal includes video information components for reproducing a visual indication of the scene being televised, audio information components for reproducing the sound accompaniment and synchronizing components for controlling operation of the horizontal and vertical scanning circuits in the television receiver. The video information and synchronizing components of the television signal comprise amplitude modulations, whereas the audio components comprise frequency modulations. The synchronizing components are separated in amplitude from the video information components, being larger than any of the video information components and occurring at relatively constant amplitude levels. The television signal is subject to noise pickup from many sources and often the noise components greatly exceed the magnitude of the synchronizing components. These noise signals often interfere with the proper synchronization of the circuitry in the television receiver responsible for developing the horizontal and vertical sweep voltages. The results of this type of interference may be picture jitter, horizontal tearing, vertical rolling, etc. As is well known in the art, the vertical circuit is most susceptible to disturbances of this type.

Most well designed television receivers have some sort of noise protection circuitry. In general there are two main methods of noise protection. One is noise gating and the other is noise cancellation. In the noise gating type of noise protection circuit, noise pulses above a certain amplitude are effective to immobilize the synchronizing signal separator circuit in the television receiver. The theory is that it is better to lose output from the synchronizing signal separator for a brief interval of time, usually corresponding to a few horizontal lines, than to allow large noise pulses therein which may prematurely trigger the circuits responsible for developing the deflection voltages.

The noise cancellation technique is different in that it is based on the principle that the noise signal may be removed from the television signal by algebraically combining it with a similar though oppositely poled signal developed responsive to the noise signal. This system has the advantage of insuring that the synchronizing circuits of a television receiver will not be immobilized even for short periods of time, but will always remain operational.

While the theory of noise cancellation has been known for some years, satisfactory results with circuits embodying this theory have not been obtainable. All of the circuits of the prior art have suffered from various defects, since it is a difficult task to develop a noise cancelling circuit which will respond faithfully to the extreme variations in signal level and signal to noise ratios encountered in the operation of a modern day television receiver. The circuit of the invention embodies a combination of elements cooperating in a manner such that the noise cancellation circuit operates faithfully over extremely wide variations in signal level and signal to noise ratio. One of the features of this circuit, aside from its excellent performance, lies in the use of a single tube envelope housing three independent triode tube sections, respectively performing noise inversion and cancellation, synchronizing signal separation, and automatic gain control voltage development.

Accordingly the principal object of this invention is to provide an improved noise protection circuit for television receivers;

Another object of this invention is to provide an improved noise cancellation circuit;

Still another object of this invention is to provide a noise cancellation circuit employing a noise inverter tube in which the conduction level of the noise inverter tube is continuously adjusted in accordance with signal level changes;

A further object of this invention is to provide a noise cancellation circuit for television receivers which not only performs better than similar circuits of the prior art but does so in a more economical manner;

A still further object of this invention is to provide a noise cancellation circuit for a television receiver in which the video amplifier output capabilities and the noise inverter cancellation ability are so apportioned as to prevent over cancellation of noise pulses during weak signal reception;

A feature of this invention resides in the provision of a single tube envelope incorporating therein three independent triode tube sections, one for noise inversion and cancellation, another for synchronizing signal separation, and a third for development of an automatic gain control potential.

Another feature of this invention lies in the provision of means interconnecting the screen electrode of the video amplifier and the grid of the automatic gain control tube whereby the automatic gain control section of the receiver is assisted in operation for both extremely strong and extremely weak input signals to the video amplifier.

Figure 2:
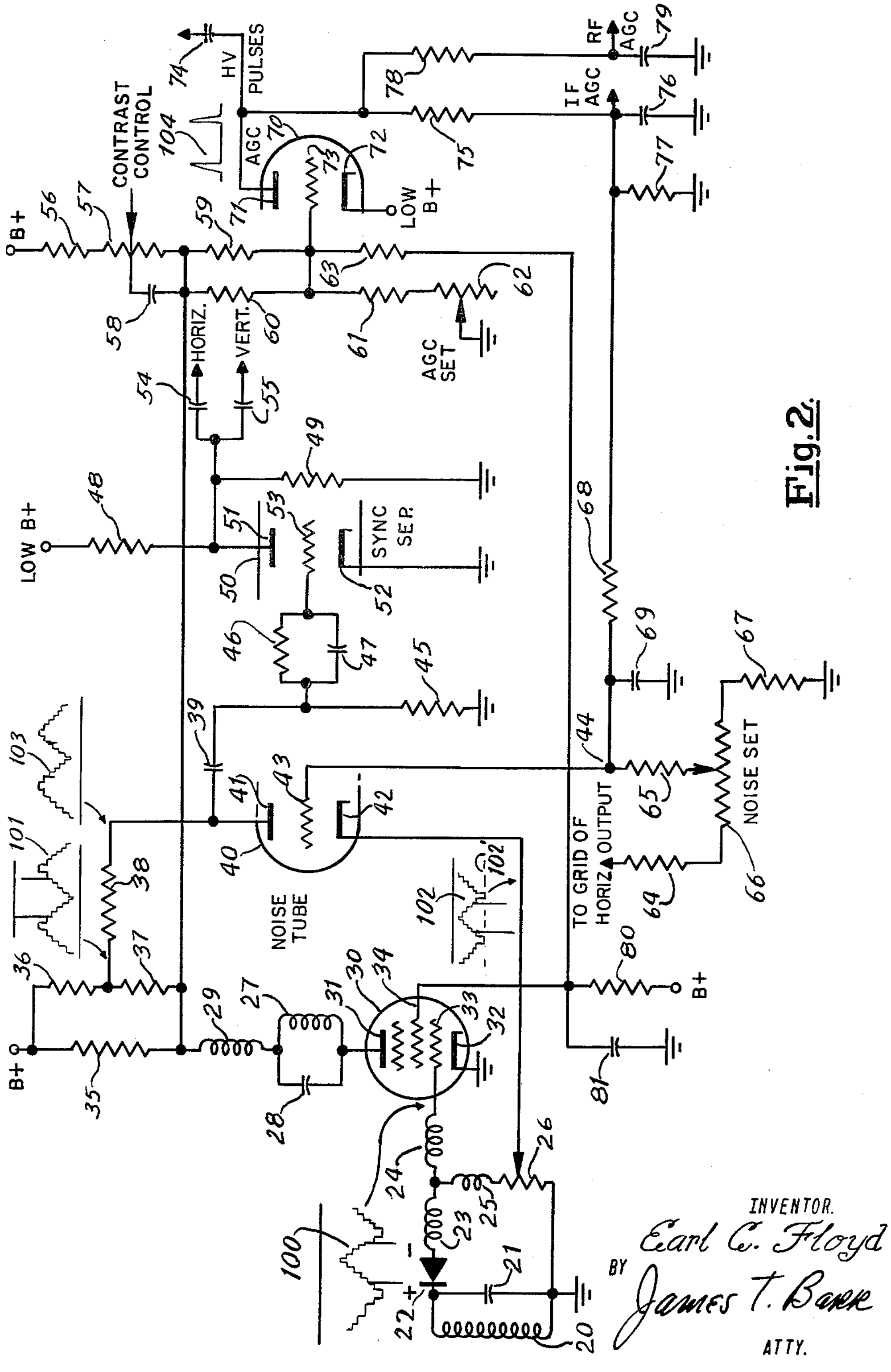

Further objects and features of this invention will be apparent upon reading of the specification in conjunction with the drawings in which:

FIG. 1 represents a block diagram of a complete television receiver embodying the circuit of the invention; and FIG. 2 represents a schematic diagram of the circuit of the invention.

Referring now to FIG. 1, a television signal is received by antenna 5 and coupled to converter 6. Converter 6 is well known in the art and includes a radio frequency amplifier, a local oscillator, and a mixer for developing an intermediate frequency television signal. The output of converter 6 is coupled to an intermediate frequency amplifier 7 where the intermediate frequency signal is amplified. The intermediate frequency (IF) signal is fed to video detector 8 which drives video amplifier 10.

An audio circuit 9 is shown coupled to video detector 8 and includes a sound intermediate frequency amplifier, a sound detector, a sound amplifier and a speaker. Audio circuit 9 may be coupled instead to the video amplifier output by use of suitable traps, as is known in the art. Video amplifier 10 amplifies the composite video signal from video detector 8 and is coupled to a synchronizing signal separator 11 and an automatic gain control (AGC) circuit 17. Video amplifier 10 also drives the signal input circuit (not shown) of picture tube 13. A portion of the video detector signal is coupled to noise inverter 14, which is also coupled to video amplifier 10. Noise inverter 14 operates, in a manner to be described fully hereinafter, to sense large noise impulses in the signal from video detector 8 and to develop corresponding, though oppositely poled, signals for application to the output of video amplifier 10. Noise cancellation occurs and synchronizing signal separator (sync separator) 11 is fed a relatively noise free signal.

The output of sync separator 11 is coupled to the vertical circuit 12 which is responsible for generating deflection voltages in conjunction with the vertical winding on picture tube 13. The sync separator is also coupled to the horizontal and AFC (automatic frequency control) circuit 15.

The horizontal oscillator (not shown) is of the free running type and has a natural frequency of oscillation close to the horizontal line synchronizing frequency of the television signal. The output of the oscillator feeds a horizontal output circuit (not shown) which is coupled to the receiver high voltage section 16. The AFC circuit compares the horizontal oscillator frequency with the frequency of the horizontal line synchronizing components in the television signal and provides correction voltages to hold the horizontal oscillator at the line synchronizing frequency. This arrangement is well known in the art.

High voltage section 16 develops the horizontal sweep voltages for the deflection windings of picture tube 13 as well as the high voltage direct current necessary for operation of the picture tube. High voltage pulses, occurring at the horizontal sweep rate, are fed to AGC circuit 17 to develop what is commonly called a gated or keyed AGC control voltage. High voltage section 16 is also coupled to horizontal and AFC circuit 15 to provide the necessary pulses for the automatic frequency control section to stabilize the horizontal oscillator at the proper frequency.

The AGC voltage developed in AGC circuit 17 is coupled to the converter 6 and also to the IF amplifier 7. Noise inverter circuit 14 is coupled to the IF amplifier AGC potential. It should be noted that the lead connecting video amplifier 10 with AGC circuit 17 actually comprises two individual coupling paths as will be apparent by reference to FIG. 2.

Winding 20 is tuned by parallelly connected capacitor 21 and comprises a portion of the last intermediate frequency transformer (not shown) in the intermediate frequency amplifier 7 of FIG. 1. Winding 20 is connected to ground at its lower terminal and to a diode detector 22 at its upper terminal. A series of tuning coils 23, 24 and 25 are utilized in a conventional manner so that a negative going composite video signal is coupled to control grid 33 of video amplifier tube 30. This composite video signal is developed across the circuit comprising winding 25 and tapped resistor 26. Tapped resistor 26 is required since the video detector must also feed the cathode of the noise inverter tube, which constitutes a heavy load. Therefore only a portion of the composite video signal is coupled to the cathode by virtue of tapped resistor 26.

Video amplifier 30 comprises a pentode type tube having an anode 31, a cathode 32, a control grid 33 and a screen grid 34. The last grid, that is the suppressor grid, is not indicated with a separate reference numeral since it plays no part in the invention and is assumed to be connected in a conventional manner. Cathode 32 is grounded and anode 31 is connected to B+ through a tuned circuit comprising capacitor 28 and coil 27, a peaking coil 29, and a load resistance combination. The load resistance combination comprises resistor 35 which is parallelled by serially connected resistors 36 and 37. A resistor 38 is connected to the junction of resistors 36 and 37 and the anode of noise tube 40. B+ for screen grid 34 is supplied through a fairly large resistor 80. A capacitor 81 bypasses the screen grid to ground.

Noise tube 40 includes an anode 41, a cathode 42 and a control grid 43. Cathode 42 is connected to tapped resistor 26 which is used to select a portion of the composite video signal. Control grid 43 is connected to a junction 44. A capacitor 39 couples the anode of noise tube 40 to sync separator tube 50. The entire coupling circuit comprises capacitor 39 and resistor 45, to the junction of which is connected the parallel combination of resistor 46 and capacitor 47. The other end of this combination of resistor 46 and capacitor 47 is connected to grid 53 of sync separator tube 50. This arrangement is well known in the art and is commonly called a "double time constant" coupling circuit for the sync separator tube. Anode 51 of sync separator 50 is coupled to a low B+ supply voltage through a load resistor 48. Cathode 52 of tube 50 is connected to ground. A resistor 49 is connected to the junction of anode 51 and resistor 48 and in conjunction with resistor 48 comprises a voltage divider arrangement for the sync separator tube. Anode 51 is coupled to horizontal circuitry (not shown) through a suitable coupling capacitor 55.

The junction of video amplifier load resistors 35 and 37 is connected to grid 73 of AGC tube 70 through a resistor 60. Grid 73 is connected, through a fixed resistor 61 and a variable resistor 62, to ground. Variable resistor 62 is labelled AGC Set and is utilized to adjust the automatic gain control level for the individual television receiver in accordance with the strongest signal which said receiver is to receive. Another connection to grid 73 exists from B+, through resistor 56, through variable resistor 57, and through a fixed resistor 59. A lower portion of variable resistor 57, which is the contrast control in the receiver, is bypassed by a capacitor 58. Additionally, the upper terminals of resistors 59 and 60 are joined, this junction also being connected to the video amplifier load resistors. A connection to grid 73 also exists, through a resistor 63, to the screen grid 34 of video amplifier 30.

AGC tube 70 has its anode 71 coupled through a capacitor 74 to high voltage section 16 (not shown in this figure). Anode 71 is also connected to a pair of integrating networks comprising resistor 75 and capacitor 76, and resistor 78 and capacitor 79, respectively. The junction between resistor 78 and capacitor 79, labelled RF-AGC, is connected to converter 6, shown in FIG. 1. The junction of resistor 75 and capacitor 76, labelled IF-AGC, is connected to IF amplifier 7 in FIG. 1. This latter junction feeds a network comprising resistor 77, resistor 68, and capacitor 69, which is coupled to junction 44, previously mentioned. Junction 44 is also connected, through a resistor 65, to a Noise Set variable resistance control 66. One end of this control is connected to ground through a resistor 67, and the other end to the grid of the horizontal output tube (not shown) in horizontal and AFC circuit 15 of FIG. 1. The latter connection is through a resistor 64. A description of the operation of the circuit now follows.

Omitting the function of the noise tube 40 and the audio circuit, the television intermediate frequency signal is detected by video detector 22, which develops the composite video signal. This signal is fed to control grid 33 of video amplifier 30. As is indicated by diagram 100, this composite signal is negative going and may contain spurious noise pulses of relatively large amplitude. The signal is amplified by video amplifier 30 and coupled to sync separator 50 and AGC tube 70. The "double time constant" input circuit of sync separator 50 acts to pass only the extreme portions of the signal, that is the synchronizing components. These components are separated in sync separator 50 and coupled to the horizontal and vertical circuits, respectively. The amplified composite video signal is coupled to the grid of the AGC tube 70, the anode of which is subjected to a gating or keying pulse, indicated by waveform 100. This type AGC circuit is well known in the art and is commonly called gated or keyed AGC. The high voltage pulses of waveform 100 occur in synchronism with the synchronizing components of the signal fed to grid 73. The cathode 72 of AGC tube 70 is connected to a source of low B+ and hence the tube is normally cut-off. However, during the occurrence of synchronizing components, a high voltage pulse is fed to the anode 71 of AGC tube 70, driving the tube conductive. The magnitude of the conduction current drawn by AGC tube 70 is determined by the magnitude of the synchronizing components in the composite video signal. This circuit is effective to produce negative potentials at the points labelled IF–AGC and RF–AGC which potentials vary in accordance with the magnitude of the incoming signal.

If the composite signal is large, grid 73 is driven heavily positive and a large current flows through tube 70, resulting in a large negative control voltage being developed across the integrating networks. Conversely, if the signal is small the opposite effect occurs and a correspondingly smaller control voltage is developed. The developed AGC potentials are fed back to converter 6 and IF amplifier 7 to control the gain of these portions of the television receiver. Thus, under normal signal conditions, the magnitude of the input signal to video detector 22 is held relatively constant as a result of this AGC action.

A portion of the composite video signal is coupled to cathode 42 of noise inverter tube 40. This signal is negative going and tends to drive the noise tube conductive. However, noise tube 40 is maintained at cut-off by virtue of the negative potential impressed on grid 43, from the grid circuit of the horizontal output tube (not shown). This negative potential is substantially constant for all signal conditions.

Grid 43 of noise tube 40 thus has a constant negative potential applied thereto to maintain it nonconductive for all video and synchronizing information components of the composite television signal. Grid 43 is also connected through a network previously described to the IF–AGC control potential which varies in accordance with signal level. The Noise Set control 66 is adjusted so that the potential on grid 43 is sufficient to hold noise tube 50 nonconductive for all negative signals applied to cathode 42 except those a predetermined amount or more in excess of the amplitude of the synchronizing portions of the composite television signal. Upon occurrence of such large signals, noise tube 40 is driven conductive as cathode 42 becomes negative with respect to grid 43. Assuming a waveform substantially as shown at 100, the waveform applied to cathode 42 will be as shown at 102. However, only the portions below dashed line 102' will be effective to cause conduction in tube 40.

Waveform 101 indicates the amplified composite video signal and the noise pulses therein. For normal signal levels to video amplifier 30, the maximum amplitude of noise pulses in the video amplifier output is limited by cutoff of the tube. Noise pulse in excess of those causing cutoff in the grid circuit are clipped. The output signal from video amplifier 30 is algebraically added across resistor 38 to the output signal of noise tube 40, resulting in cancellation of the noise pulses. The result is a waveform substantially as shown by 103. This noise free waveform is coupled by the coupling network previously indicated to grid 53 of sync separator 50 where the synchronizing components are separated. Thus, the noise pulses are prevented from entering the synchronizing signal separator circuit and hence can produce no deleterious effects upon the horizontal and vertical circuitry of the television receiver.

It should be obvious to those skilled in the art that for normal signals, a fixed Noise Set level will suffice to cancel noise pulses before they reach the synchronizing signal separator. However, in the presence of large variations in signal strength a fixed noise tube bias is undesirable. If the signal is excessively strong, noise tube 40 may be driven conductive responsive to the synchronizing components and result in cancellation of these components. This of course will result in complete loss of synchronization in the television receiver. If the signal is weak and noisy, the signal to noise ratio will be decreased by the video amplifier gain characteristic and result in incomplete, if any, noise cancellation by noise tube 40.

This situation is obviated by connecting noise inverter grid 43 to an additional control source which is capable of following variations in the levels of the received television signals. Connection of grid 43 through the coupling circuit to the IF–AGC potential provides this variable potential.

Ideally, noise tube 40 should have a large amplification factor as well as a high plate current capability. However, triode tubes having these characteristics are not generally available and therefore means are provided to match the capabilities of the video amplifier tube with the capabilities of the noise inverter tube. This means comprises circuitry for coupling the output of the video amplifier tube to the noise tube anode at a reduced level. The combination of elements performing this function are resistors 35, 36 and 37.

In this type circuit it is highly desirable that the AGC control voltage track the incoming signal accurately. As is well known in the art, when a rapid transition is made from a strong signal to a weak signal or vice versa, both the AGC circuit and the sync separator circuit may not respond quickly enough and the result may be missynchronization in the television receiver. To assist the sync separator circuit, and to a limited extent the AGC circuit, a circuit described in Patent No. 2,927,156, issued to Robert Jones, is utilized. Briefly, the connection of screen grid 34 of video amplifier tube 30 to B+ through resistor 80 helps keep the signal to the sync separator near the value to which it is held when the AGC circuit is effective. The screen grid draws current in proportion to the conduction current flowing in the video amplifier. If an extremely weak signal is fed to the control grid of the video amplifier the conduction current therein increases. This increase in conduction current is sensed by the screen grid which, due to its connection to B+ through resistor 80, suffers a voltage drop. Thus the screen grid potential falls as it draws more current. This decline in screen grid potential in effect shifts the transfer characteristic of the video amplifier tube in a direction which tends to maintain the level of the sync tips in the output signal at the level to which they are normally held by the AGC circuit. Thus the sync separator is protected from large, rapid changes in input signal level. By maintaining the input signal level to the sync separator fixed, the amplitude of any noise fed thereto is minimized. Thus during this critical transient interval the noise inverter is also assisting in performing its cancellation function.

It will be recalled that the screen grid of the video amplifier is also connected to the control grid of the AGC tube through a resistor 63. This connection greatly enhances the response of the AGC circuit, which circuit controls the conduction level of the noise inverter tube. Assume a large input signal to the video amplifier. The video amplifier will be cut off by the sync components and the screen grid will cease drawing current. This results in a rapid increase in the screen voltage, which increase is immediately reflected at the AGC tube control grid, thus insuring rapid development of AGC voltage. This AGC voltage reduces the gain of the receiver prior to the video detector and biases the noise inverter tube back strongly to prevent cancellation of the sync pulses. Conversely, upon receipt of a very weak signal (large conduction current in the video amplifier), the screen voltage falls quickly and this change is communicated to the AGC tube which results in a smaller developed control voltage. Hence the noise inverter can respond quickly to rapid signal level changes, thus greatly improving its noise cancelling ability in these critical areas.

The connection of the control grid of the noise tube to a source of control potential which varies in accordance with the signal level also prevents over cancellation of noise pulses in the video signal which give rise to white spots in the displayed picture. These white spots are the result of holes being cut into the video information when the cancellation pulse is larger than the noise pulse. Over cancellation occurs in the presence of extremely strong signals in which the sync tips come very close to the cut-off portion of the video amplifier transfer characteristic. In such case, noise pulses extending beyond the sync tips are clipped and hence are not materially larger, in the output circuit of the video amplifier, than the sync tip portions. These noise pulses however are not clipped or compressed when they are coupled to the cathode of the noise tube, and give rise to large cancellation signals. The algebraic cancellation of the positive going noise pulse with the negative going cancellation pulse at the anode of the noise tube may result in over cancellation and consequent chopping into the video portion of the signal. This effect is substantially eliminated by adjusting the noise tube conduction level in accordance with the incoming signal strength so that for strong signals the noise tube is much less sensitive, that is it is more difficult to drive into conduction.

In a practical circuit embodying the invention tubes 40, 50 and 70 are all contained in one tube envelope. This tube arrangement makes for a very economical package of excellent performance. The Noise Set control is not required once the circuit parameters have been established, it being replaced by fixed resistors. The circuit as described utilizes keyed AGC, but non-gated AGC may also be employed.

It is understood that numerous modifications in the circuits shown may be made without departing from the true spirit and scope of the invention as defined in the following claims.

What is claimed is:

1. In combination in a television receiver including means for producing a composite video signal having information components and periodic reference components from a received television signal, said reference components being greater in magnitude than said information components, said television signal being subject to undesired spurious components of greater magnitude than said reference components; a video amplifier and a load resistor therefor; means for applying said composite signal to said video amplifier; a noise inverter tube for inverting and cancelling said spurious components including an anode, a cathode and a control grid; a resistor connected between a point intermediate the ends of said video amplifier load resistor and said anode for coupling the output of said video amplifier to said noise inverter anode at reduced level; means for coupling said composite video signal to said cathode at a reduced level; means for applying a constant direct current bias to said control grid whereby said noise inverter tube only conducts on signals of greater magnitude than said reference components; control voltage means coupled to said video amplifier load resistor for developing a control voltage in accordance with the magnitude of said reference components; means in said video amplifier, and responsive to the conduction current in said video amplifier, coupled to said control voltage means for conveying information regarding changes in said conduction current thereto; and means for coupling said control voltage to said control grid whereby the conduction level of said noise inverter tube is automatically adjusted as the level of said composite video signal varies.

2. In combination in a television receiver including means for producing a negatively oriented composite video signal having information components and periodic reference components from a received television signal, said reference components being greater in amplitude than said information components, said television signal being subject to undesired spurious noise components of greater amplitude than said reference components; a video amplifier including a cathode, a control grid, a screen grid and an anode; means for applying said negatively oriented composite video signal between the cathode and control grid of said video amplifier; a source of positive potential; a tapped load resistance connected between said video amplifier anode and said source of potential; a noise inverter tube for inverting and cancelling said spurious noise components including an anode, a cathode and a control grid; a resistor connected between the tap on said video amplifier load resistance and the anode of said noise inverter tube for coupling the output of said video amplifier at reduced level to said noise inverter anode; direct current means coupling said negative going composite video signal to the cathode of said noise inverter tube at reduced level; means for applying a constant negative direct current bias potential to the control grid of said noise inverter tube whereby said noise inverter tube is only driven conductive for signals of greater amplitude than said reference components; separating means coupled to the anode of said noise inverter tube for separating said periodic reference components; a gain control tube having a cathode, a control grid and an anode; direct current means for coupling said load resistance of said video amplifier to the control grid of said gain control tube; an integrating network connected to the anode of said gain control tube; means for applying high voltage pulses to the anode of said gain control tube in synchronism with said periodic reference components on its control grid for driving said tube conductive in accordance with the amplitude of said reference components, said integrating network developing a negative control potential varying as a function of the amplitude of said reference components; means, including a resistor, coupling the screen grid electrode of said video amplifier to said source of potential; means connecting the screen grid electrode of said video amplifier to the control grid of said gain control tube for coupling variations in the video amplifier conduction current to the control grid of said gain control tube; means coupling said integrating network to the control grid of said noise inverter tube for automatically adjusting the conduction level thereof in accordance with signal level changes, whereby said noise inverter tube is driven conductive by spurious noise components of greater amplitude than said reference components and cancels said spurious noise components present in the output of said video amplifier tube thus producing a signal free of said spurious noise components for said separating means.

3. In a television receiver as set forth in claim 2 wherein said noise inverter tube, said separating means, and said gain control tube, individually comprise independent electron discharge devices included in a common evacuated tube envelope.

References Cited in the file of this patent

UNITED STATES PATENTS

| | | |
|---|---|---|
| 2,797,258 | Denton | June 25, 1957 |
| 2,823,257 | Sonnenfeldt | Feb. 11, 1958 |
| 2,841,646 | Thomas | July 1, 1958 |
| 2,868,873 | Splitt | Jan. 13, 1959 |
| 2,927,156 | Jones | Mar. 1, 1960 |
| 2,945,090 | Scott | July 12, 1960 |
| 2,950,344 | Gibson | Aug. 23, 1960 |